(12) United States Patent
Castelblanco Cruz et al.

(10) Patent No.: US 11,144,752 B1
(45) Date of Patent: Oct. 12, 2021

(54) PHYSICAL DOCUMENT VERIFICATION IN UNCONTROLLED ENVIRONMENTS

(71) Applicant: Cyxtera Cybersecurity, Inc., Coral Gables, FL (US)

(72) Inventors: Alejandra Castelblanco Cruz, Bogota (CO); Martin Ochoa Ronderos, Bogota (CO); Jesus Alberto Solano Gomez, Bogota (CO); Esteban Rivera Guerrero, Bogota (CO); Lizzy Tengana Hurtado, Bogota (CO); Christian David Lopez Escobar, Bogota (CO)

(73) Assignee: Cyxtera Cybersecurity, Inc., Coral Gables, FL (US)

( * ) Notice: Subject to any disclaimer, the term of this patent is extended or adjusted under 35 U.S.C. 154(b) by 0 days.

(21) Appl. No.: 15/930,334

(22) Filed: May 12, 2020

(51) Int. Cl.
*G06K 9/00* (2006.01)
*G06T 7/194* (2017.01)
*G06K 9/46* (2006.01)
*G06K 9/62* (2006.01)
*G06T 7/13* (2017.01)

(52) U.S. Cl.
CPC .......... *G06K 9/00456* (2013.01); *G06K 9/46* (2013.01); *G06K 9/6217* (2013.01); *G06T 7/13* (2017.01); *G06T 7/194* (2017.01); *G06T 2207/20132* (2013.01)

(58) Field of Classification Search
CPC .... G06K 9/00456; G06K 9/46; G06K 9/6217; G06T 7/194; G06T 7/13; G06T 2207/20132
See application file for complete search history.

(56) References Cited

U.S. PATENT DOCUMENTS 8,995,774 B1 * 3/2015 van Deventer .... G06K 9/00463 382/217
9,355,312 B2 * 5/2016 Amtrup .............. G06K 9/00456
(Continued)

OTHER PUBLICATIONS

Fully Convolutional Networks for Semantic Segmentation, Jonathan Long et al., CVPR, 2015, pp. 3431-3440 (Year: 2015).*
(Continued)

*Primary Examiner* — Jayesh A Patel
(74) *Attorney, Agent, or Firm* — Greenberg Traurig (57) ABSTRACT

A method for verifying authenticity of a physical document includes receiving an image of a physical document to be authenticated including the physical document and a background. A pre-processed image is produced that includes the physical document separated from the background. The producing includes separating the physical document from the background by semantic segmentation utilizing an artificial neural network trained using an augmented dataset generated by applying geometric transformations over different backgrounds. Features of the pre-processed image are extracted to determine a document type. In response to determining the document type of the physical document, the method includes verifying, utilizing a machine learning classifier, whether the physical document is authentic based on the extracted features relative to expected features for the corresponding document type. An indication of whether the physical document is authentic based on the verifying is generated.

18 Claims, 5 Drawing Sheets

(56) References Cited

U.S. PATENT DOCUMENTS

| | | | |
|---|---|---|---|
| 10,242,283 B1* | 3/2019 | Jain | G06Q 50/265 |
| 10,635,898 B1* | 4/2020 | Pribble | G06K 9/228 |
| 10,902,252 B2* | 1/2021 | Flament | G06K 9/00456 |
| 2014/0185909 A1* | 7/2014 | Penna | G06K 9/38 |
| | | | 382/138 |
| 2016/0171311 A1* | 6/2016 | Case | G06K 9/00771 |
| | | | 382/103 |
| 2018/0108101 A1* | 4/2018 | Rodriguez | G06K 19/06028 |
| 2019/0114743 A1* | 4/2019 | Lund | G06N 3/0454 |
| 2019/0164010 A1* | 5/2019 | Ma | G06K 9/00711 |
| 2019/0340429 A1* | 11/2019 | Berseth | G06K 9/00449 |
| 2021/0042950 A1* | 2/2021 | Wantland | G06T 7/174 |

OTHER PUBLICATIONS

Video Salient Object Detection via Fully Convolutional Networks, Wenguan Wang et al., IEEE, 1057-7149, 2017, pp. 38-49 (Year: 2017).*

* cited by examiner

FIG. 5 ural network.

PHYSICAL DOCUMENT VERIFICATION IN UNCONTROLLED ENVIRONMENTS

RELATED APPLICATIONS

Field of the Technology

At least some embodiments disclosed herein relate generally to image recognition, and more particularly, to image recognition using deep learning and an artificial neural network.

Background

Remote identity document (ID) verification systems are a widespread commercial demand to provide scalable registration services. In a remote ID verification system, an ID is generally localized and relevant information is extracted from pictures taken by, for example, a mobile device. These systems then ensure that the input corresponds to an expected document type so that perceptible document forgery can be detected before accepting the document as genuine.

Improved methods for remote ID verification are desirable.

BRIEF DESCRIPTION OF THE DRAWINGS

References are made to the accompanying drawings that form a part of this disclosure and illustrate embodiments in which the systems and methods described in this Specification can be practiced.

Like reference numbers represent like parts throughout.

DETAILED DESCRIPTION

Verification of physical documents is increasingly desirable due to the prevalence of mobile devices. For example, mobile devices can be used to verify a physical identity document (e.g., a state ID, driver's license, or the like) of an individual when, for example, using a remote web service provider, eliminating (or reducing) the need for the individual to show the physical identity document in-person to the web service provider. In an embodiment, the remote web service provider can be accessed using a mobile application, a web browser, or the like on the mobile device.

Systems and methods for improved verification of physical documents are disclosed. The physical documents can include physical documents having a generally fixed format so that features (e.g., text, photographs or other images, or the like) are repeatedly included in the same location of the physical document. For example, physical documents can include identity documents such as state identification cards, driver's licenses, or the like; event tickets such as sports tickets, concert tickets, or the like; birth certificates; invoices; or the like.

A "physical document" generally includes a tangible document. Examples of physical documents include, but are not limited to, identity documents (e.g., an identification card or other government issued identification document such as a passport, driver's license, state identification card, or the like); event tickets (e.g., sports tickets, convert tickets, or the like); birth certificates; invoices; or the like. It is to be appreciated that the above list is not exhaustive but can vary in accordance with the principles described herein.

In the context of this description, physical documents generally include a fixed format so that features (e.g., text (numbers, letters, symbols, and combinations thereof), photographs or other images, or the like) are repeatedly included in the same location of the physical document. For example, a driver's license for a given state will typically have a photograph in a location selected by the issuing entity, identifying information in the form of text in various locations selected by the issuing entity. Generally, the issuing entity will utilize the same locations for the photographs and identifying information regardless of the individual to whom the driver's license is issued.

A method for verifying authenticity of a physical document is disclosed. The method includes receiving an image of a physical document to be authenticated. The image includes the physical document and a background. A computing device produces a pre-processed image. The pre-processed image includes the physical document separated from the background. The producing includes separating the physical document from the background by semantic segmentation. The semantic segmentation utilizes an artificial neural network trained using an augmented dataset generated by applying geometric transformations over different backgrounds. The producing also includes one or more of a corner detection analysis and a brightness analysis. The method further includes extracting, by the computing device, features of the pre-processed image to determine a document type of the physical document. The features are defined based on the document type. In response to determining the document type of the physical document, the method includes verifying, by the computing device, whether the physical document is authentic based on the extracted features relative to expected features for the corresponding document type. The verifying utilizes a machine learning classifier. The computing device generates an indication of whether the physical document is authentic based on the verifying.

A method for localizing an image is also disclosed. The method includes providing a plurality of physical document images and a plurality of background images. Each of the plurality of physical document images includes a physical document and each of the plurality of background images includes a background absent a physical document. The method includes selecting one or more subsets including the plurality of physical document images and the plurality of background images. For each of the subsets, the method includes generating a simulated image using the physical document images and the background images and providing the simulated images to a fully convolutional neural network with binary masks of the corresponding set of physical document images and background images as inputs to train the fully convolutional neural network. The fully convolutional network is trained to recognize a portion of the simulated image that includes the physical document image and a portion of the simulated image that includes the background image as expected outputs of processing the simulated image. The fully convolutional neural network runs on at least one server machine having at least one processor and at least one non-transitory computer readable medium.

A system is disclosed that includes a computing device coupled to a network. The computing device includes a processing device configured to execute instructions to in response to receiving an image of a physical document to be authenticated, the image including the physical document and a background, produce a pre-processed image. The pre-processed image includes the physical document separated from the background including separating the physical document from the background by semantic segmentation. The semantic segmentation utilizes an artificial neural network trained using an augmented dataset generated by applying geometric transformations over different backgrounds. One or more of a corner detection analysis and a brightness analysis are performed. Features of the pre-processed image are extracted to determine a document type of the physical document. The features are defined based on the document type. In response to determining the document type of the physical document, the processor is configured to verify whether the physical document is authentic based on the extracted features relative to expected features for the corresponding document type. The verification utilizes a machine learning classifier. The computer device generates an indication of whether the physical document is authentic based on the verifying.

Figure 1:
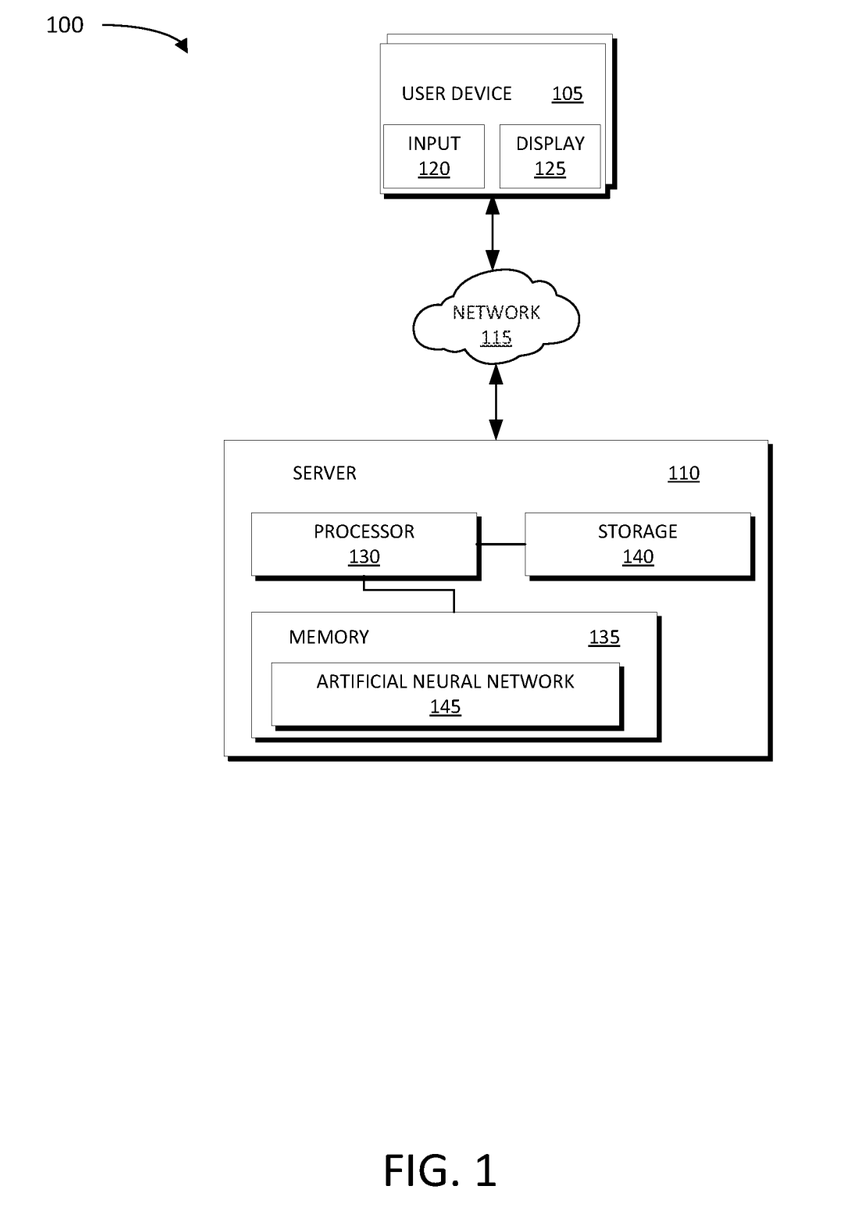
FIG. 1 is a schematic block diagram of a system for implementing the physical document verification systems and methods described herein, according to an embodiment.

FIG. 1 is a schematic block diagram of a system 100 for implementing the physical document verification systems and methods described herein, according to an embodiment. In the system 100, an image of a physical document can be captured and verified for authenticity.

The system 100 includes a plurality of user devices 105 connected in communication to a server 110 via a network 115.

A user can authenticate a physical document via the user device 105. Examples of devices suitable for the user devices 105 include, but are not limited to, a personal computer (PC); a laptop computer; a mobile device such as, but not limited to, a smartphone, a smartwatch, a tablet, a personal digital assistant (PDA); or the like. The user device 105 can include an input device 120 and a display device 125. The input device 120 can be, for example, an image capturing device 120. In an embodiment, the image capturing device 120 can be representative of a camera. In an embodiment, the display device 125 can include a monitor, a laptop screen, a mobile device screen, or the like. In an embodiment, the display device 125 can be integral with an input device (e.g., a touchscreen) of the user device 105.

The user device 105 generally includes a processor, memory, a network input/output (I/O), user I/O, storage, and an interconnect. The processor can retrieve and execute programming instructions stored in the memory and/or the storage. The processor can also store and retrieve application data residing in the memory. The interconnect is used to transmit programming instructions and/or application data between the processor, the user I/O, the memory, the storage, and the network I/O. The interconnect can, for example, be one or more busses or the like. The processor can be a single processor, multiple processors, or a single processor having multiple processing cores. In an embodiment, the processor can be a single-threaded processor. In an embodiment, the processor can be a multi-threaded processor.

The memory is generally included to be representative of a random access memory such as, but not limited to, Static Random Access Memory (SRAM), Dynamic Random Access Memory (DRAM), or Flash. In an embodiment, the memory can be a volatile memory. In an embodiment, the memory can be a non-volatile memory. In an embodiment, at least a portion of the memory can be virtual memory.

The storage is generally included to be representative of a non-volatile memory such as, but not limited to, a hard disk drive, a solid-state device, removable memory cards, optical storage, flash memory devices, network attached storage (NAS), or connections to storage area network (SAN) devices, or other similar devices that may store non-volatile data. In an embodiment, the storage is a computer readable medium. In an embodiment, the storage can include storage that is external to the user device, such as in a cloud.

In an embodiment, an application can be loaded onto the user devices 105 that can include one or more features of the server 110. For example, the application can make a GUI available to the user device 105, according to an embodiment. In an embodiment, the application can include information from the database 120 such that information from the database need not be obtained over the network 115 from the server 110.

The server 110 includes a generally includes a processor 130, memory 135, and storage 140. It is to be appreciated that the server 110 can generally include one or more additional features, such as, but not limited to, a network input/output (I/O), user I/O, storage, and an interconnect.

The processor 130 can retrieve and execute programming instructions stored in the memory 135 and/or the storage 140. The processor 130 can also store and retrieve application data residing in the memory 135. The processor 130 can be a single processor, multiple processors, or a single processor having multiple processing cores. In an embodiment, the processor can be a single-threaded processor. In an embodiment, the processor 130 can be a multi-threaded processor. The processor 130 can include instructions for implementing an artificial neural network 145.

The memory is generally included to be representative of a random access memory such as, but not limited to, Static Random Access Memory (SRAM), Dynamic Random Access Memory (DRAM), or Flash. In an embodiment, the memory can be a volatile memory. In an embodiment, the memory can be a non-volatile memory. In an embodiment, at least a portion of the memory can be virtual memory.

The storage is generally included to be representative of a non-volatile memory such as, but not limited to, a hard disk drive, a solid-state device, removable memory cards, optical storage, flash memory devices, network attached storage (NAS), or connections to storage area network (SAN) devices, or other similar devices that may store non-volatile data. In an embodiment, the storage is a computer readable medium. In an embodiment, the storage can include storage that is external to the user device, such as in a cloud.

The network 115 can generally be representative of the Internet. In an embodiment, the network 115 can include, for example, a local area network (LAN), a wide area network (WAN), a wireless network, a cellular data network, combinations thereof, or the like.

Figure 2:
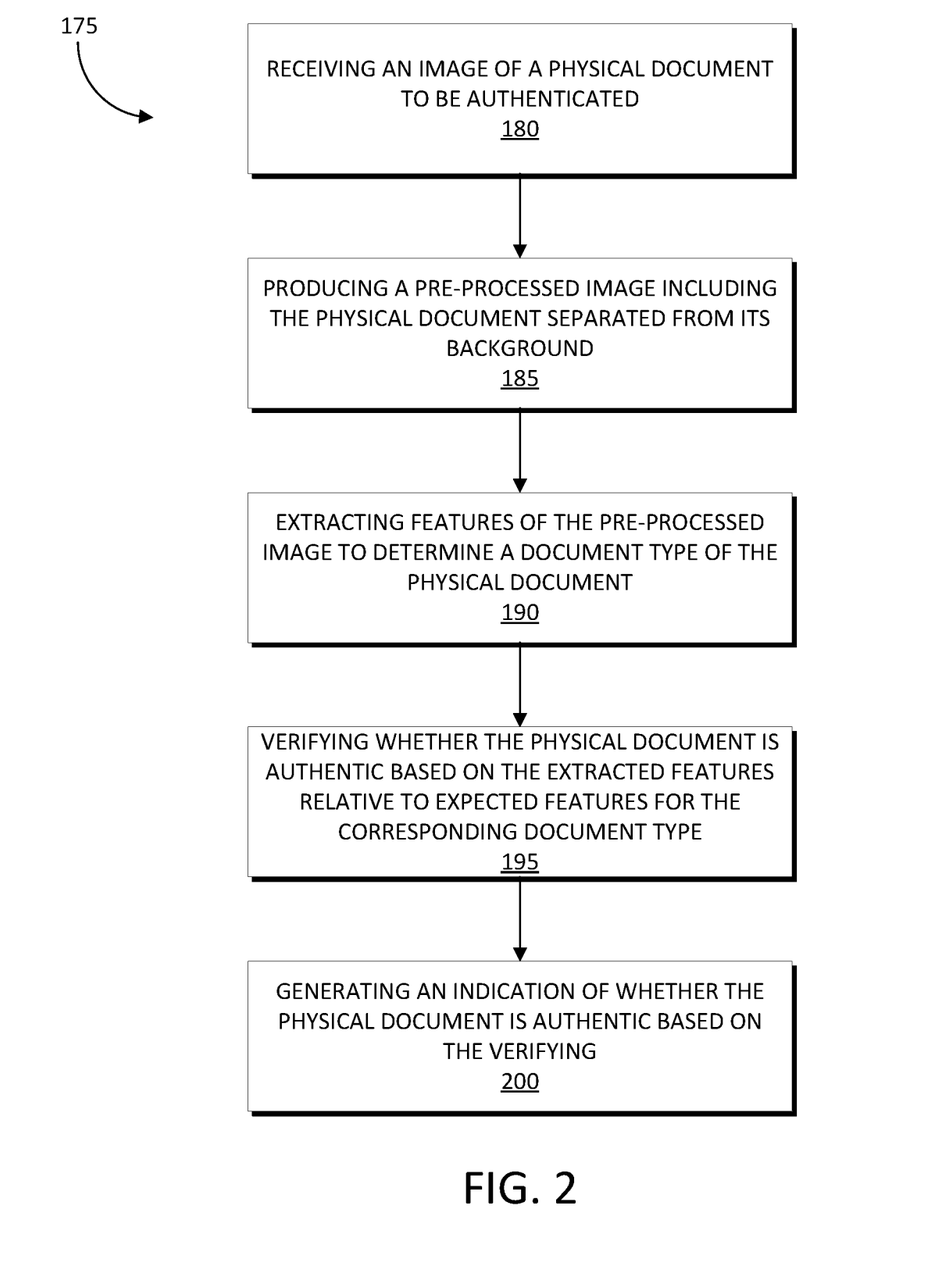
FIG. 2 is a flowchart of a method for authenticating a physical document, according to an embodiment.

FIG. 2 is a flowchart of a method 175 for authenticating a physical document, according to an embodiment.

At block 180, the method 175 includes receiving an image of a physical document to be authenticated. The image of the physical document generally includes the physical document and a background. In an embodiment, the image of the physical document to be authenticated can be received from an image capturing device of a user device (e.g., the image capturing device 120 of the user device 105 (FIG. 1)). In an embodiment, the image of the physical document to be authenticated can be received from a scanner or other image capturing device. In an embodiment, the image of the physical document to be authenticated can be received from a storage device that includes previously captured images of physical documents to be authenticated.

At block 185, the method 175 includes producing a pre-processed image. The pre-processed image includes the physical document separated from the background. The pre-processed image can be produced by a combination including one or more of semantic segregation, cropping, aligning, and brightness analysis. The pre-processing in block 185 is discussed in additional detail in accordance with FIG. 3 below.

At block 190, the method 175 includes extracting features of the pre-processed image to determine a document type of the physical document. The features extracted are fixed for a corresponding document type. For example, in an embodiment, the physical document may be a driver's license and include a photograph in a particular location. For a driver's license issued by another entity (e.g., a different document type), a photograph may be included in a different location.

At block 195, the method 175 includes, at least partially in response to determining the document type of the physical document, verifying whether the physical document is authentic based on the extracted features relative to expected features for the corresponding document type. The expected features for the corresponding document type may be based on, for example, a model physical document that is used to define locations at which the features are to be expected. The verification can utilize a machine learning classifier to arrive at the decision of whether the physical document is authentic.

At block 200, the method 175 includes generating an indication of whether the physical document is authentic based on the verifying. For example, the verifying may result in a determination that the physical document is authentic. In such case, the indication may be to accept the physical document as authentic.

Alternatively, the verifying may result in a determination that the physical document is not authentic. In such case, the indication may be to reject the physical document as being inauthentic.

In an embodiment, if the verifying results in an inability to decide that the physical document is authentic, the indication may be to reject the physical document as being inauthentic. In an embodiment, if the verifying results in an inability to decide that the physical document is authentic, then the method 175 can be configured to generate an indication that the authentication verification was inconclusive, that the authentication verification should be performed again, a combination thereof, or the like. In an embodiment, producing the pre-processed image at block 185 should reduce likelihood of receiving an inconclusive authentication.

Figure 3:
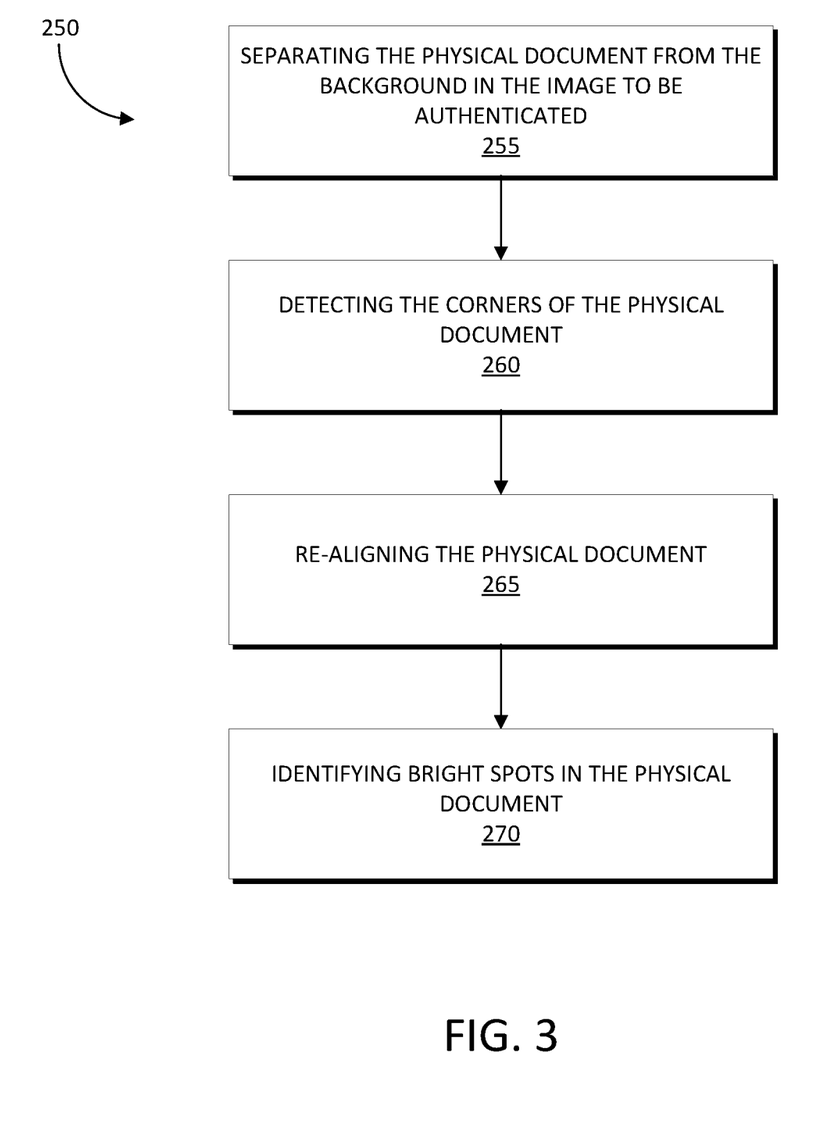
FIG. 3 is a flowchart of a method for pre-processing an image of a physical document to be authenticated, according to an embodiment.

FIG. 3 is a flowchart of a method 250 for pre-processing an image of a physical document to be authenticated, according to an embodiment. The image of the physical document to be authenticated includes (1) the physical document and (2) background (i.e., surroundings of the physical document). The method 250 generally results in a pre-processed image of the physical document with the background having been removed. In an embodiment, the pre-processed image can be used as an input for a document verification process (e.g., the document verification process in FIG. 4 below).

At block 255, the method 250 includes separating the physical document from the background by semantic segmentation. The semantic segmentation utilizes an artificial neural network trained using an augmented dataset generated by applying geometric transformations over different backgrounds. The artificial neural network is trained with a binary mask associated with each of the images. The binary mask indicates which pixels correspond to the background and which pixels correspond to the document. The semantic segmentation includes classifying each pixel in the image of the physical document to be authenticated as fitting into one of two possible classes: (1) physical document or (2) background. The pixel classification results in a reconstructed image with a high contrast background in which the shape of the physical document is highlighted relative to the background. In an embodiment, block 255 may be optional. In such an embodiment, the method 250 begins directly at block 260.

At block 260, the method 250 includes detecting the corners of the physical document. In an embodiment, the corners of the physical document can be detected based on a linear regression of contours in the reconstructed image with the high contrast background. In an embodiment in which the block 255 is not included, the corners are detected at block 260 on the image of the physical document to be captured instead of the reconstructed image generated in block 255.

The corner detection includes finding the contour of the physical document to derive a sequence of connected pixels along a border of the physical document. The extracted contour sequence can then be used to perform a linear regression on each side/edge of the physical document. Intersections between border lines are defined as the corners of the physical document.

From the defined corners, a geometric transformation matrix can be determined. The geometric transformation matrix can be used to straighten the reconstructed image to produce a well-oriented document using a perspective transformation at block 265.

At block 270, the method 250 includes identifying bright spots in the physical document. In an embodiment, block 270 may be optional. However, including the optional brightness analysis may reduce a chance that the method 175 results in an inconclusive authentication.

Once the image has been cropped and aligned in blocks 260 and 265, the physical document is analyzed to verify whether there are high brightness areas in the image (e.g., flashes, imbalanced lighting, etc.). In an embodiment, in response to determining high brightness areas exist, the image may be rejected. In an embodiment, the image may be rejected so that the extraction of features (document authentication in FIG. 4 below) is not performed unsuccessfully.

The brightness analysis includes separating the image into hue, saturation, and value channels (HSV), The third channel, value (V), can be used as a measure of brightness.

The image is divided into an n*m bins grid. The average of V over all pixels belonging to a given bin determines the brightness value of that bin ($B_{ij}$) with i=(1, . . . , n), j=(1, . . . , m). The average brightness can be calculated as:

$$Br_\mu = \frac{1}{n \times m} \left( \sum_{i,j}^{n,m} B_{i,j} \right)$$

The standard deviation of the average brightness can be calculated as:

$$Br_\sigma = \sqrt{\frac{1}{(n \times m) - 1} \left( \sum_{i,j}^{n,m} B_{ij} - Br_\mu \right)}$$

Using the average brightness and the standard deviation of the average brightness, a maximum intensity threshold can be calculated as:

$$Br_{max} = Br_\mu + \alpha * Br_\sigma.$$

In the maximum intensity threshold, a is a control parameter for the brightness threshold (e.g., how many standard deviations above $Br_\mu$ the brightness threshold will be).

To identify bright zones in the input image, a Gaussian blur filter can be applied to the third channel (e.g., value (V)) of the image. Then, a threshold can be applied to binarize the input image. Then, each pixel above $Br_{max}$ is modified to 255 (white pixel) and below $Br_{max}$ to 0 (black pixel). Then, sets of white pixels are grouped using a connected component labelling process, which identifies adjacent pixels with same color. These pixel groups are classified as bright zone candidates. Finally, a bright zone candidate is determined to be a bright spot if the number of pixels in the blob is greater than 5% of the image size. In an embodiment, if a bright spot is identified, then the method can include generating an indication of a failed authentication process. In an embodiment, the indication can include an indication that a new image of the physical document to be authenticated is needed to proceed with authentication.

Figure 4:
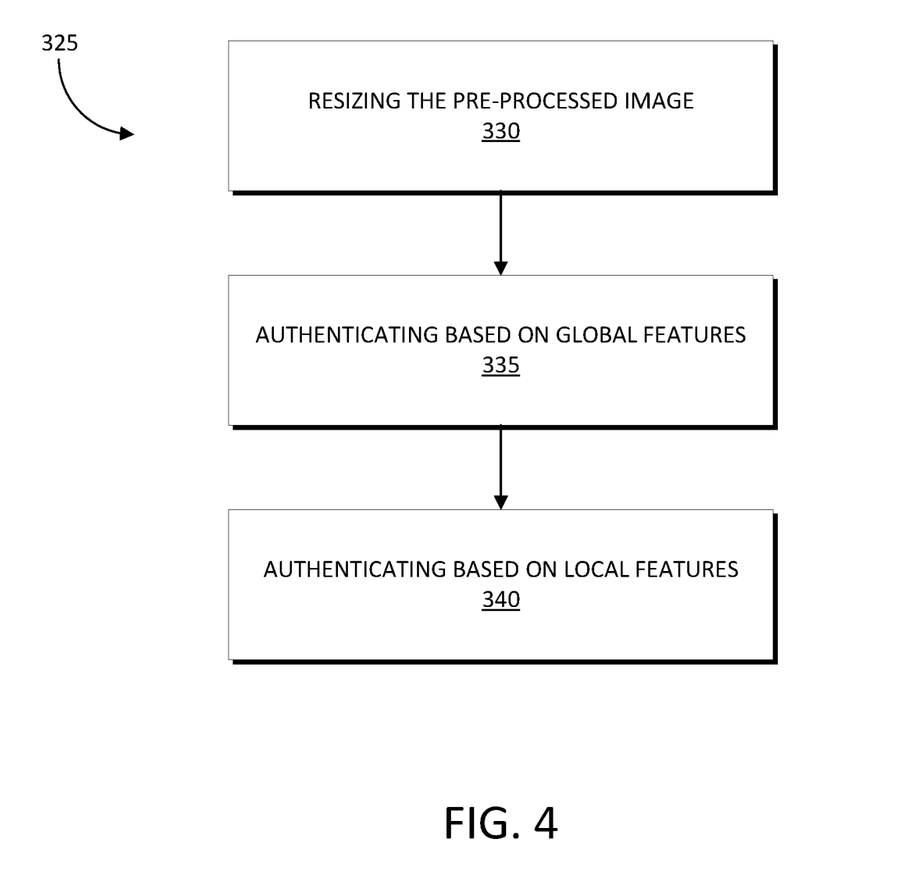
FIG. 4 is a flowchart of a method for authenticating a physical document, according to an embodiment.

FIG. 4 is a flowchart of a method 325 for authenticating a physical document, according to an embodiment. The authenticating of the physical document generally includes validating a set of features that describe the visual and layout information of the input image (i.e., the pre-processed image). The method 325 generally includes checking basic characteristics of the physical document that correspond to features that describe the whole image (i.e., global features) and checking characteristics that correspond to a specific region or a characteristic in the pre-processed image (i.e., local features).

At block 330, the method 325 includes resizing the pre-processed image. In an embodiment, this includes resizing the pre-processed image to be 459×297 pixels. It is to be appreciated that this size is an example and that the actual size of the image can be selected to vary beyond the stated value. In an embodiment, the size to which the pre-processed image is resized can be selected based on, for example, a lowest camera resolution for commercially available image capturing devices on mobile devices while maintaining the proportions of the pre-processed image (and accordingly, the original document).

At block 335, the method 325 includes authenticating based on global features. In an embodiment, authenticating based on global features can include one or more of: authenticating using a Wasserstein distance (WD); authenticating using hue saturation differences (HSD); and authenticating based on structural similarities. It is to be appreciated that this list is an example and can vary according to the principles described herein.

Authenticating Using WD

Grayscale histograms of the input image can be compared against an authentic physical document image (i.e., a model physical document image). To handle the variability from the acquisition environments, the grayscale histograms can be normalized using a min-max feature scaling. To measure similarity between the grayscale histograms, the WD can be used. In an embodiment, the WD metric, which is based on the theory of optimal transport between distributions, may provide better discrimination between the classes compared to other goodness of fit metrics such as Pearson's chi-squared distance and histogram bin-to-bin intersection.

Authenticating Using HSD

A sum of the hue and saturation differences between the input document image and the model physical document image can be calculated. Channels can be converted to the HSV space and the document area can be split in N rectangular bins. For each bin i, the differences between the average hue and average saturation, for the input image and the model physical document image can be summed. The overall hue and saturation differences can be normalized dividing by the maximum possible differences. The HSD can be calculated as seen in the following equation, with N=50, that is 5 and 10 sections along the height and width respectively.

$$HSD = \frac{\sum_{i=0}^{N} h(i)_X - h(i)_G}{179 * N} * \frac{\sum_{i=0}^{N} s(i)_X - s(i)_G}{255 * N}$$

Authenticating Using SS

The structural similarity (SSIM) can be included to extract information from the spatial dependencies of the pixel value distributions. A subtraction of the average intensity and variance normalization can be performed on the input image. Once this is done, comparison between the input image (x) and the model physical document image (y) can be calculated by evaluating functions dependent on the luminance (I), contrast (c), and value (V) correlations of the pixel arrays.

$$SSIM(x, y) = l(x, y) * c(x, y) * V(x, y) = \frac{(2\mu_x \mu_y + c_1)(2\sigma_{xy} + c_2)}{(\mu_x^2 + \mu_y^2 + c_1)(\sigma_x^2 + \sigma_y^2 + c_2)}$$

In the above equation, $\mu_x$ is the average of x; $\mu_y$ is the average of y; $\sigma_x^2$ is the variance of x; $\sigma_y^2$ is the variance of y; $\sigma_{xy}$ is the covariance of x and y; $c_1 = (k_1 L)^2$; $c_2 = (k_2 L)^2$, where L is the dynamic range of the pixel-values; $k_1 = 0.01$ by default; and $k_2 = 0.03$ by default. It is to be appreciated that the values of constants $k_1$ and $k_2$ are examples and can vary beyond the stated values.

This metric can be implemented to compare the structural composition of the background between two documents. Classification results may be improved when areas of the physical document that vary between subjects was covered in black (i.e., masked), such as pictures and customizable text inputs.

At block 340, the method 325 includes authenticating based on local features. In an embodiment, the local features for verification can be adjusted based on the selected type of physical document to be authenticated.

In an embodiment, authenticating based on local features can include one or more of: authenticating user a number of faces found (NF); authenticating based on a face location (FL); authenticating based on a templating matching location (TML); authenticating based on a template matching score (TMS); authenticating based on a color coherence hue ($CC_{ic1:3}$); and color coherence saturation (CC-S). It is to be appreciated that this list is an example and can vary according to the principles described herein.

Authenticating Based on Face Detection

The existence of a face within a specific region of the document can be evaluated and transformed into two different features. A simple 5-point landmark detection can be calculated, based on the Histogram of Oriented Gradients and a sliding window. The output features from this verification step can be: an integer with the number of faces found (NF) on the input image (if all landmarks were found), and a Boolean indicating if the face location (FL) matched a predefined valid region.

Authenticating Based on Template Matching

Another method that ensures the existence of a specific visual characteristic, such as a header or a high contrast symbol, is template matching. For this analysis, the input image can be analyzed in grayscale, along with an example of the authentic document template region. The method consists in sliding a window of the original template over the input image and calculating a correlation measurement. Afterwards, coordinates of the location in the image with the highest correlation are given.

Authenticating Based on Color Coherence

The proposed method can identify continuous regions with connected color and saturation values and compare these regions between two images. The input image can be transformed to the HSV space and the hue and saturation channels discretized in B number of bins. A structural window, that acts as a filter, slides through the discretized image to identify connected color regions. Connected regions, larger than a certain threshold size, can be selected to create binary masks. The binary mask indicates which pixels correspond to the background and which pixels correspond to the document. After applying the described procedure, a number of $N_h$ hue binary masks and Ns saturation binary masks can be created for both the model physical document image and the input document image. To calculate the output features, each mask in the model physical document image can be compared with the closest mask from the input image. For instance, if comparing the $i^{th}$ hue mask $M_{hue\_i(model\ physical\ document\ image)}$ from the model physical document image, the selected mask $M_{hue\_i(input\ image)}$ of the input image is the mask with the closest hue value and with the closest Euclidean distance to the 2D center of mass from $M_{hue\_i(model\ physical\ document\ image)}$. Finally, the Jaccard similarity coefficient between the masks $M_{hue\_i(model\ physical\ document\ image)}$ and $M_{hue\_i(input\ image)}$ is the output feature.

Figure 5:
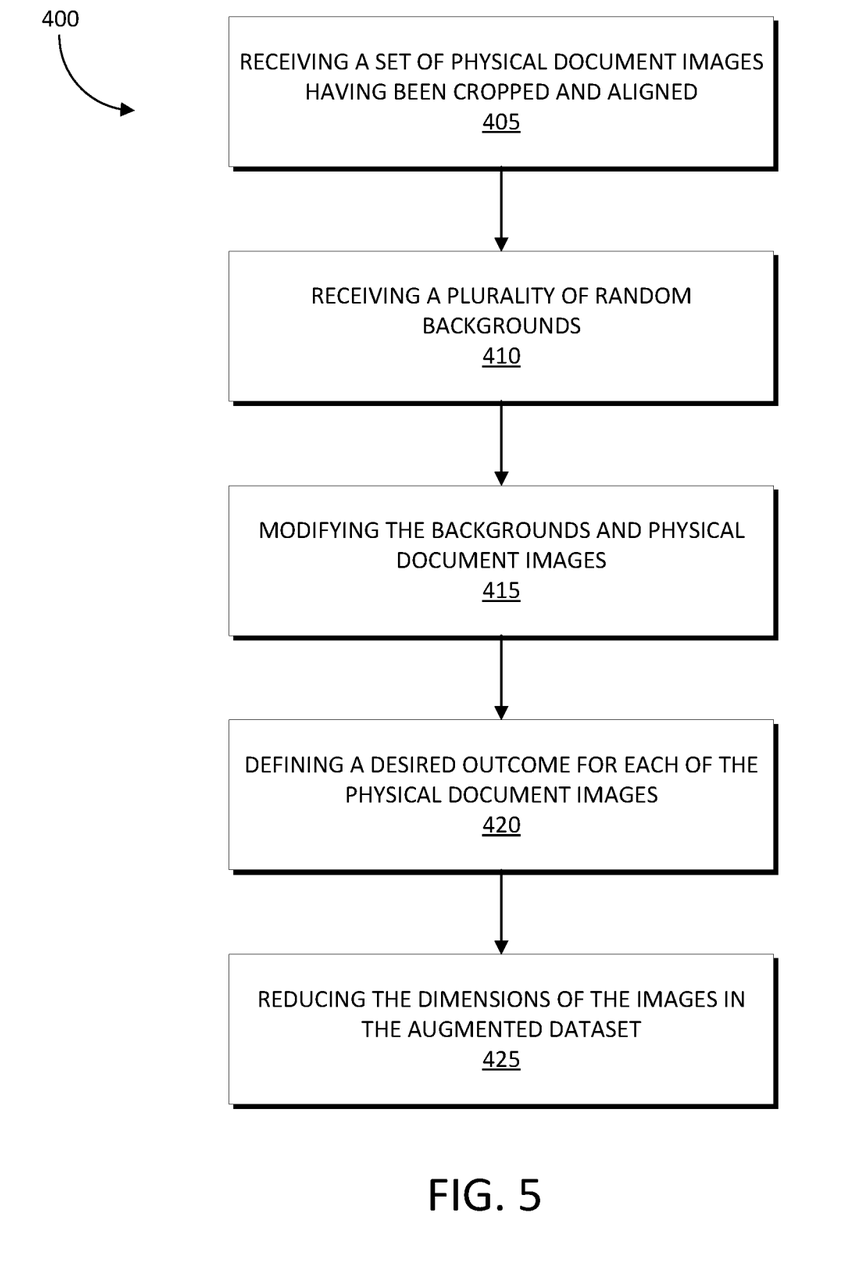
FIG. 5 is a flowchart of a method for training an artificial neural network for pre-processing an image, according to an embodiment.

FIG. 5 is a flowchart of a method 400 for training an artificial neural network for pre-processing an image (e.g., the pre-processing at block 185 in FIG. 2 above), according to an embodiment.

At block 405, the method 400 includes receiving a set of physical document images that were cropped and aligned. For example, in an embodiment, the method 400 includes receiving 40 images of physical documents captured in good lighting conditions that were cropped and aligned.

At block 410, the method 400 includes receiving a plurality of random backgrounds. For example, in an embodiment the method 400 includes receiving 50 random backgrounds that include varied environments and textures.

At block 415, the method 400 includes modifying the backgrounds and physical document images were modified to generate the augmented dataset. The modifications included modifying the perspective, size, and textures of the backgrounds and the physical document images, as well as combining the physical document images and the backgrounds to form a collective image that includes a physical document image and a background. The perspectives were modified with changing up-down tilt, right-left tilt, and combinations thereof, ranging from −15° to +15°. The images were also rotated, ranging from 0° to 359°.

In an example embodiment, 33,382 variations of document images were created for the augmented dataset.

At block 420, the method 400 includes defining a binary mask for each of the physical document images. The binary mask indicates which pixels correspond to the background and which pixels correspond to the document.

At block 425, the method 400 includes reducing dimensions of the images in the augmented dataset. For example, in an embodiment the size of the images was reduced to 128×128 pixels. It is to be appreciated that the stated image size is an example and that the image size can vary beyond the stated values. However, with increasing image sizes also comes a higher processing power required. Accordingly, selecting the image size is a trade-off between accuracy and processing power requirements.

The embodiments described can provide a complete pipeline for verification of physical documents in uncontrolled environments. The embodiments include both document type classification and evaluation of authenticity.

In an evaluation of the above-described methodology, 101 physical identity documents from the Republic of Colombia were evaluated. An augmented dataset including 33,382 documents with diverse backgrounds was used to apply deep-learning techniques. The background detection in the pre-processing (e.g., block 255 of FIG. 3) achieved an accuracy of 98.41%. The authenticity classifier (e.g., FIG. 4) achieved an accuracy of 97.7% and an F1-score of 0.974.

The systems and methods described herein include an accurate pipeline for physical document authenticity verification. The embodiments described can provide a fast and accurate deep learning classification model that can separate a physical document from the background in an image (regardless the colors and textures in the background).

In view of these improvements, document authentication in remote identity verification systems can be performed while reducing a burden on a user to physically review the physical document. This can, for example, reduce fraudulent enrollment attempts and give more confidence in the remote identity verification systems.

Examples of computer-readable storage media include, but are not limited to, any tangible medium capable of storing a computer program for use by a programmable processing device to perform functions described herein by operating on input data and generating an output. A computer program is a set of instructions that can be used, directly or indirectly, in a computer system to perform a certain function or determine a certain result. Examples of computer-readable storage media include, but are not limited to, a floppy disk; a hard disk; a random access memory (RAM); a read-only memory (ROM); a semiconductor memory device such as, but not limited to, an erasable programmable read-only memory (EPROM), an electrically erasable programmable read-only memory (EEPROM), Flash memory, or the like; a portable compact disk read-only memory (CD-ROM); an optical storage device; a magnetic storage device; other similar device; or suitable combinations of the foregoing.

In some embodiments, hardwired circuitry may be used in combination with software instructions. Thus, the description is not limited to any specific combination of hardware circuitry and software instructions, nor to any source for the instructions executed by the data processing system.

The terminology used herein is intended to describe embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

It is to be understood that changes may be made in detail, especially in matters of the construction materials employed and the shape, size, and arrangement of parts without departing from the scope of the present disclosure. This Specification and the embodiments described are examples, with the true scope and spirit of the disclosure being indicated by the claims that follow.

What is claimed is:

1. A method for verifying authenticity of a physical document, comprising:
   receiving an image of a physical document to be authenticated, the image including the physical document and a background;
   producing, by a computing device, a pre-processed image, the pre-processed image including the physical document separated from the background, wherein the producing includes:
      separating the physical document from the background by semantic segmentation, the semantic segmentation utilizing an artificial neural network trained using an augmented dataset generated by applying geometric transformations over different backgrounds; and
      one or more of: a corner detection analysis and a brightness analysis;
   extracting, by the computing device, features of the pre-processed image to determine a document type of the physical document, wherein the features are defined based on the document type;
   in response to determining the document type of the physical document, verifying, by the computing device, whether the physical document is authentic based on the extracted features relative to expected features for the corresponding document type, the verifying utilizing a machine learning classifier; and
   generating, by the computing device, an indication of whether the physical document is authentic based on the verifying.

2. The method of claim 1, wherein the artificial neural network is trained with a plurality of images of physical documents, a first of the plurality of images of physical documents including a corresponding physical document and background and a second of the plurality of images of physical documents including a background with at least a part of the physical document not being visible.

3. The method of claim 1, the machine learning classifier for the verifying whether the physical document is authentic is trained with a plurality of images of physical documents.

4. The method of claim 1, wherein the physical document is one of an identity document, an event ticket, a birth certificate, or an invoice.

5. The method of claim 1, comprising:
   cropping the image.

6. The method of claim 1, wherein the computing device is a mobile computing device.

7. The method of claim 6, wherein the mobile computing device is one of a smartphone, a smartwatch, a tablet, a laptop, or the like.

8. The method of claim 6, wherein the mobile computing device includes an image capturing device and the image of the physical document to be authenticated was captured from the image capturing device.

9. A method for localizing an image, the method comprising:
   providing a plurality of physical document images and a plurality of background images, wherein each of the plurality of physical document images includes a physical document and each of the plurality of background images includes a background absent a physical document;
   selecting one or more subsets including the plurality of physical document images and the plurality of background images;
   for each of the subsets:
      generating a simulated image using the physical document images and the background images;
      providing the simulated images to a fully convolutional neural network with binary masks for the corresponding set of physical document images and background images as inputs to train the fully convolutional neural network; and
      training the fully convolutional network to recognize a portion of the simulated image that includes the physical document image and a portion of the simulated image that includes the background image as expected outputs of processing the simulated image;
   wherein the fully convolutional neural network runs on at least one server machine having at least one processor and at least one non-transitory computer readable medium.

10. The method of claim 9, comprising:
   detecting the corners of the physical document image, including:
      finding a contour of the physical document image; and
      based at least in part on the contour of the physical document image, performing a linear regression on each side of the physical document image to identify intersections between border lines which define corners of the physical document image.

11. The method of claim 10, comprising:
   identifying brightness areas that are outside a threshold brightness; and
   in response to identifying brightness areas that are outside the threshold brightness, generating an error message and rejecting the physical document image.

12. A system, comprising:
   a computing device coupled to a network, the computing device including a processing device, the processing device configured to execute instructions to:
      in response to receiving an image of a physical document to be authenticated, the image including the physical document and a background, produce a pre-processed image, the pre-processed image including the physical document separated from the background, including:
         separating the physical document from the background by semantic segmentation, the semantic segmentation utilizing an artificial neural network trained using an augmented dataset generated by applying geometric transformations over different backgrounds; and one or more of: a corner detection analysis and a brightness analysis;

extract features of the pre-processed image to determine a document type of the physical document, wherein the features are defined based on the document type;

in response to determining the document type of the physical document, verify whether the physical document is authentic based on the extracted features relative to expected features for the corresponding document type, the verifying utilizing a machine learning classifier; and generate an indication of whether the physical document is authentic based on the verifying.

13. The system of claim 12, wherein the artificial neural network is trained with a plurality of images of physical documents, a first of the plurality of images of physical documents including a corresponding physical document and background and a second of the plurality of images of physical documents including a background with at least a part of the physical document not being visible.

14. The system of claim 12, the machine learning classifier that verifies whether the physical document is authentic is trained with a plurality of images of physical documents.

15. The system of claim 12, wherein the physical document is one of an identity document, an event ticket, a birth certificate, or an invoice.

16. The system of claim 12, comprising: a mobile computing device.

17. The system of claim 16, wherein the mobile computing device is one of a smartphone, a smartwatch, a tablet, a laptop, or the like.

18. The method of claim 16, wherein the mobile computing device includes an image capturing device and the image of the physical document to be authenticated was captured from the image capturing device.

\* \* \* \* \*